United States Patent [19]

Brogli et al.

[11] Patent Number: 4,547,334

[45] Date of Patent: Oct. 15, 1985

[54] LOW EXCHANGE ELEMENT FOR NUCLEAR REACTOR

[75] Inventors: Rudolf H. Brogli, Aarau, Switzerland; Bangalore I. Shamasunder; Shivaji S. Seth, both of Encinitas, Calif.

[73] Assignee: The United States of America as represented by the United States Department of Energy, Washington, D.C.

[21] Appl. No.: 296,502

[22] Filed: Jun. 26, 1981

[51] Int. Cl.⁴ .................. G21C 3/30; G21C 15/02
[52] U.S. Cl. .......................... 376/389; 376/427; 376/433; 376/352
[58] Field of Search ............... 376/433, 377, 399, 427, 376/395, 352, 435, 385, 389

[56] References Cited

U.S. PATENT DOCUMENTS

| | | | |
|---|---|---|---|
| 2,987,458 | 6/1961 | Breden et al. | 376/352 |
| 3,212,982 | 10/1965 | Astley et al. | 376/399 |
| 3,215,606 | 11/1965 | Silvester | 376/399 |
| 3,629,065 | 12/1971 | Knox | 376/377 |
| 3,676,297 | 7/1972 | Rennie et al. | 376/427 |
| 3,795,579 | 3/1974 | Chenal et al. | 376/435 |
| 4,121,973 | 10/1978 | Mysels et al. | 376/433 |
| 4,257,845 | 3/1981 | Lukaszewicz et al. | 376/352 |
| 4,326,922 | 4/1982 | Ferrari et al. | 376/435 |

FOREIGN PATENT DOCUMENTS

| | | | |
|---|---|---|---|
| 2423027 | 12/1974 | Fed. Rep. of Germany | 376/352 |
| 2835419 | 2/1980 | Fed. Rep. of Germany | 376/399 |
| 0041694 | 4/1978 | Japan | 376/352 |

Primary Examiner—Harvey E. Behrend
Attorney, Agent, or Firm—Fitch, Even, Tabin & Flannery

[57] ABSTRACT

A flow exchange element is presented which lowers temperature gradients in fuel elements and reduces maximum local temperature within high temperature gas-cooled reactors. The flow exchange element is inserted within a column of fuel elements where it serves to redirect coolant flow. Coolant which has been flowing in a hotter region of the column is redirected to a cooler region, and coolant which has been flowing in the cooler region of the column is redirected to the hotter region. The safety, efficiency, and longevity of the high temperature gas-cooled reactor is thereby enhanced.

10 Claims, 5 Drawing Figures

LOW EXCHANGE ELEMENT FOR NUCLEAR REACTOR

BACKGROUND OF THE INVENTION

The present invention relates to a system of cooling an assembly of nuclear fuel elements in a nuclear reactor, and in particular to a high temperature gas-cooled reactor (HTGR) having columns of stackable fuel elements with coolant passageways therein.

Nuclear reactors require effective heat transfer to utilize generated heat while maintaining acceptable limits on stresses and temperature levels within the core. Excessively uneven temperature distributions and higher local temperatures coupled with the given fast neutron fluence gradients can cause unacceptable stresses and fatigue in the fuel elements, which must be replaced more frequently as a consequence. Streams of relatively hot coolant, or "hot steams", exiting the core can stress surrounding materials such as those in the shielding and inlet ducts, requiring more frequent replacement and repair. Hot spots within the core can generate higher release of radioactive fission products, which, in turn, may cause higher circulating activity and plated-out activity on the surrounding metal parts. The radioactive metal requires additional protective measures in order for repairs to be effected. The higher core emissions also require greater shielding in general.

Uneven temperature distributions and high local temperatures can result from a number of causes which may vary according to reactor design. In some HTGRs the fuel is replenished through patch loading. A "patch" is a cluster of columns; for example, a central hexagonal column taken together with six adjacent columns constitutes a seven column patch. In patch-loaded HTGRs the periphery of the patch tends to be hotter than the center. This is due, in part, to the fact that adjacent patches may vary greatly in age since patches tend to be reloaded cyclically over a period of years. The power generation differential between adjacent patches of very different ages causes the portions of the columns near the boundary of the two patches to be hotter than the portions of the columns away from the boundary. Furthermore, when control rods are inserted into the center column of a patch, the power flux is driven toward the periphery of the patch contributing further to the heat differential between the patch periphery and the inner regions of the patch. Unevenness can also be generated in the regions of columns near side reflectors of the core.

In HTGRs having columns of stackable fuel elements, coolant flows through vertical coolant holes in the fuel elements and columns. Coolant flowing through the hotter regions of a column heats more rapidly than coolant flowing through the cooler regions of the reactor. Hotter coolant is less effective at cooling. This means that as the coolant approaches the bottom of the core, the least effective coolant flows through the regions in greatest need of cooling. On the other hand, the cooler regions of the column are cooled relatively effectively by the cooler flow therethrough, thereby aggravating the high temperature gradients across blocks. Furthermore, the exit temperatures of the hotter coolant can be much greater than that of nearby coolant flow, thereby creating hot streams which can cause fatigue in materials surrounding the reactor core.

The problems caused by large temperature gradients and high localized temperatures can be dealt with in part by variable orificing of the coolant holes. However, this approach is impractical on a column basis and reduces the total coolant flow for a given core pressure drop so that the average temperature is raised and heat transfer is generally diminished.

SUMMARY OF THE INVENTION

In accordance with the present invention, coolant flowing along the hotter sides along one end of a column of nuclear fuel elements is diverted to flow along the cooler side of the column at the other end. This diversion is accomplished by an exchange element in the column which has inclined passages therein to shift the coolant flow from one side of the column to a different side. Herein, the flow exchange element has the same horizontal cross section as the column into which it is to be inserted and has a height substantially less than that of the column. The flow exchange element has the same number of coolant passageways as the column. Some of the exchange element passageways are not vertical and instead extend from one vertical region of the exchange element to another.

A flow exchange element is to be inserted into a column adjacent two fuel elements of the column. The exchange element thus defines an upper portion of the column above the exchange element and a lower portion of the column below the exchange element. In a HTGR with coolant flowing downwardly through the core, the flow exchange element functions as follows. The hotter coolant from the upper portion of a hotter vertically extending region of the column is diverted to the lower portion of a cooler vertically extending region of the column by flowing through the non-vertical passageways in the exchange element. Likewise, cooler coolant from the upper portion of the cooler vertically extending region is diverted to the lower portion of the hotter vertically extending region. In this way, coolant flow is redistributed so that in the lower portion of the column the cooler and more effective coolant flows through the hotter region of the column where it is most needed. Thus, temperature gradients and local temperature maximums are reduced without appreciably impairing overall coolant flow.

In the case of a regular hexagonal column, it is preferred that the flow exchange element rotated coolant flow 180°. Generally, this will effectively redistribute coolant to reduce gradients. At the top face of the hexagonal exchange element the entrances to the coolant passageways are arranged in hexagonal rows so as to align with coolant passageways in the fuel element adjacent and above the exchange element. Each passageway nearer the periphery of the exchange element extends parallel to the sides of the exchange element on a downward slope equal to the ratio of the height to one-half the perimeter of the hexagonal row containing the entrance of the passageway.

The hexagonal exchange element may be conveniently manufactured in three slices. No more than one angle per passageway is required in any of the slices so that the straight holes may be drilled from the top or from the top and bottom of each slice to form the slice passageways; the slice passageways align to form the exchange element passageways when the slices are joined.

A primary object of this invention is to provide a column of nuclear fuel elements having coolant passages therein with means to divert coolant from a hotter side to a cooler side of the column and vice versa.

Another important object of this invention is to provide a means for reducing or eliminating hot spots and hot streams within a nuclear reactor core.

A more particular object of this invention is to provide a flow exchange element for diverting coolant flow through a stackable hexagonal fuel column.

It is also an object of this invention to provide a simple method of manufacturing a flow exchange element.

Other objects and features of the present invention will become apparent in connection with the following description and claims.

DESCRIPTION OF THE PREFERRED EMBODIMENT

Figure 1:
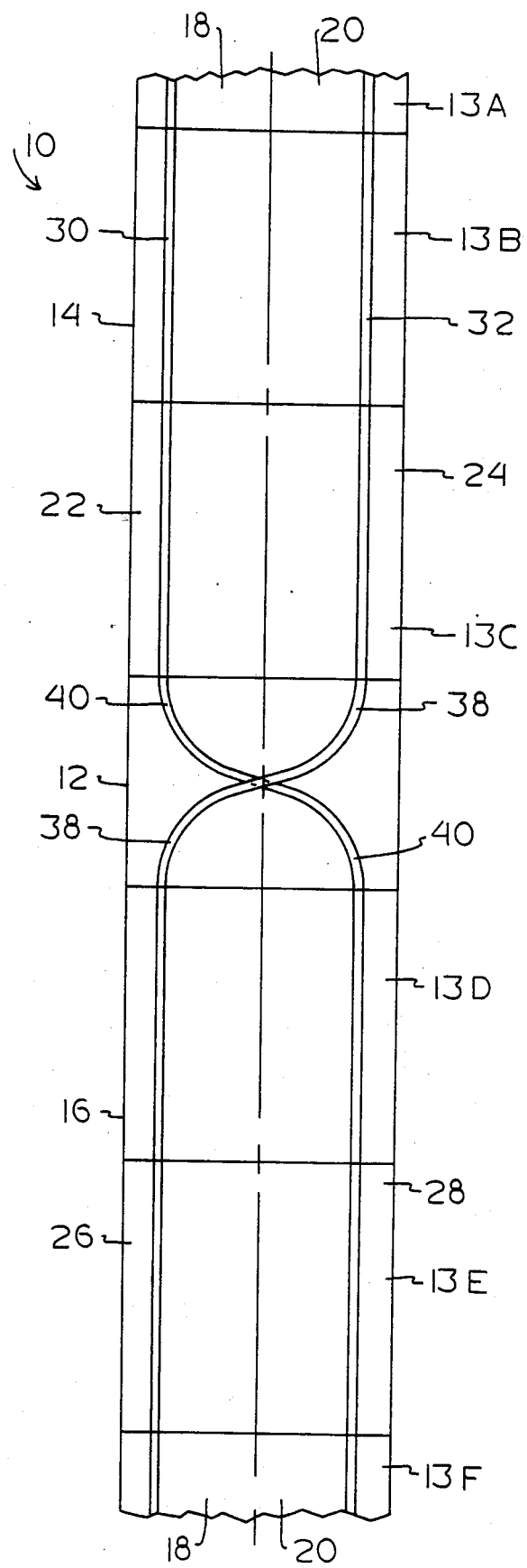
FIG. 1 is a schematic diagram illustrating the basic functioning of the present invention.

The principles of the present invention may most clearly be understood with reference to the two dimensional schematic of FIG. 1. A fuel column, a fragment of which is shown generally at 10, includes a plurality of vertically stacked and aligned upper nuclear fuel elements 13A, 13B and 13C in an upper portion 14 and a plurality of lower nuclear fuel elements 13D, 13E and 13F in a lower portion 16. For expository purposes, it is assumed that when the reactor environment is in operation the fuel elements 13A, 13B, 13C, 13D, 13E, and 13F include a hotter vertical region 18 which is subjected to more heat than a cooler vertical region 20 for the fuel elements. Accordingly, an upper portion 14, constituted by fuel elements 13A, 13B and 13C, includes a hotter upper region 22 and a cooler upper region 24, and a lower portion 16, constituted by fuel elements 13D, 13E and 13F, includes a hotter lower region 26 and a cooler lower region 28.

The present invention is applicable to HTGRs employing both upwardly and downwardly flowing coolant. However, the present description will be described in connection with a downwardly flowing coolant. When the reactor is in operation, coolant flowing through the hotter upper region 22 heats more rapidly than coolant flowing through the cooler upper region 24. By the time coolant exits the bottom of the upper portion of the column a significant temperature differential has already been established between coolant in the hotter upper passageway 30 and that in the cooler upper passageway 32. Without the flow exchange element, the hotter coolant would flow into the hotter lower region 26, and the cooler coolant would flow into the cooler lower region 28, aggravating the differential to an detrimental magnitude.

In accordance with the present invention a means 12 for effecting a flow exchange between the hotter region 18 and the cooler region 20 is disclosed. With the flow exchange means 12 in place, coolant from the cooler upper region 24 flows into the hot-shift exchange passageway 38 and exits the exchange element so as to enter the hotter lower region 26. Likewise, coolant from the hotter upper region 22 flows into a cool-shift exchange passageway 40 and exits the exchange element so as to enter the cooler lower region 28. Once the exchange is effected, the temperature differential decreases as coolant flows toward the base of the column. Of course, if the differential reaches zero before the coolant exits the core, the differential can increase once again. However, the flow exchange means may be positioned at a point where the power generated above the flow exchange means is equal to the power generated below the flow exchange means, thereby effecting a negligible exit temperature differential. Thus, horizontal gradients across the column 10 are limited and maximum local temperatures are severely reduced.

Figure 2:
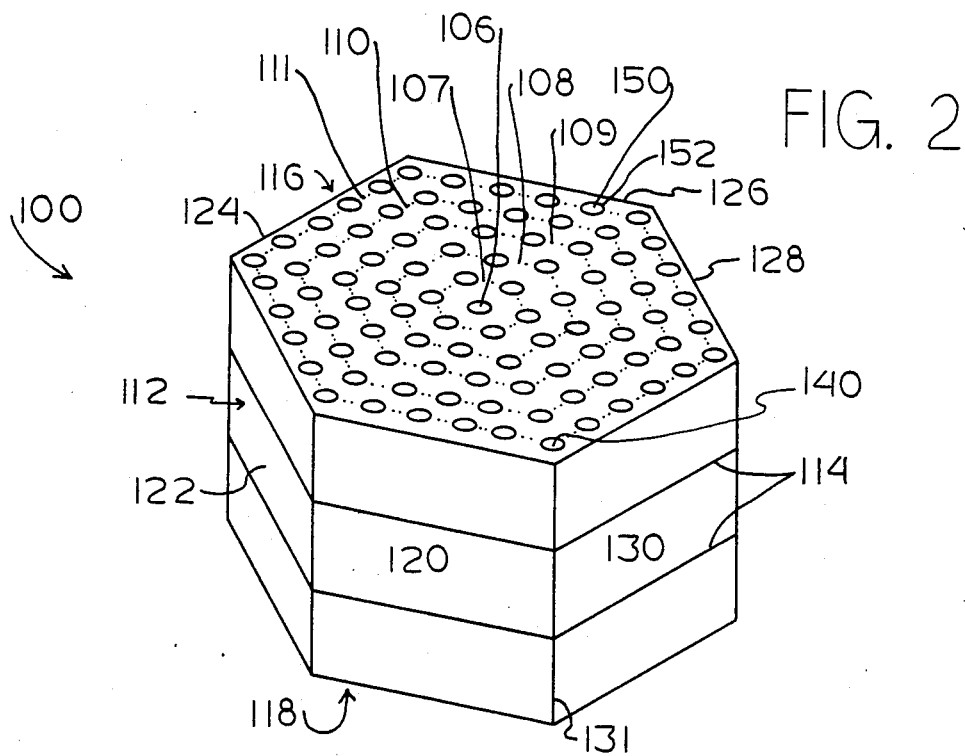
FIG. 2 is a perspective view of a flow exchange element in accordance with the present invention.

A coolant flow exchange element 100, corresponding to the flow exchange means 12 of FIG. 1, in accordance with the preferred embodiment of the present invention is shown in FIG. 2. The environment for the preferred embodiment is a hexagonal column comprising fuel blocks such as those disclosed in Fortescue et al., U.S. Pat. No. 3,413,196, which is incorporated herein as though quoted in full. The exchange element is externally similar to the adjacent fuel elements except that it includes no fuel chambers, and, preferably, is of lesser height than the fuel elements to economize on reactor space.

Figure 3:
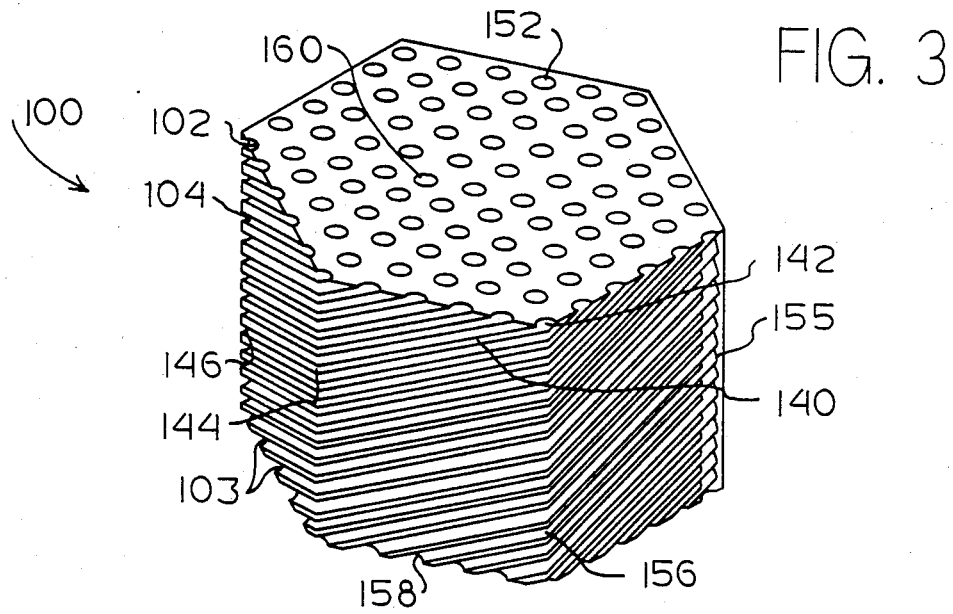
FIG. 3 is a perspective view of the flow exchange element of FIG. 2 with portions cut away.

Entrances 102 to the coolant passageways 104 are arranged in concentric hexagonal rows 107, 108, 109, 110, and 111, about center 106. Exits 103 to the passageways shownn in FIG. 3 are arranged identically on the bottom face of the exchange element. Passageways with entrances on the center 106 or the inner of the concentric hexagonal rows 107 and 108 extend axially through the block. Each passageway with an entrance on one of the outer of the concentric hexagonal rows 109, 110, and 111 extends parallel to the perimeter 112 of the exchange element along a downward slope as shown in FIG. 3. The slope is selected to effect a 180° passageway rotation from top to bottom face. The 180° rotation may be effected where the magnitude of the slope is equal to the height of the exchange element divided by one-half the perimeter of the hexagonal row containing the entrance to the passageway. Horizontal lines 114 result from the method of manufacture to be described subsequently.

Figure 4:
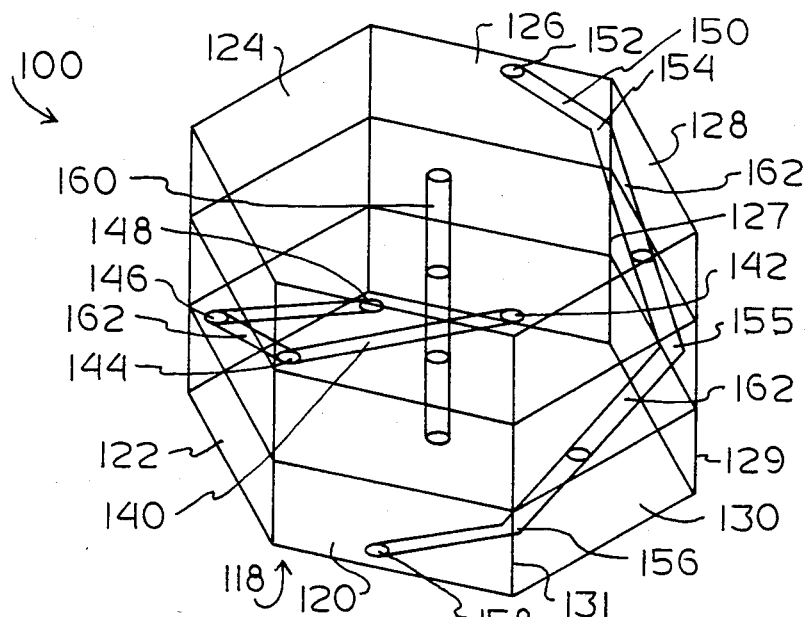
FIG. 4 is a perspective view of a flow exchange element in accordance with the present invention.

A three dimensional schematic indicating the internal structure of the preferred embodiment is presented in FIG. 4. The coolant flow exchange element shown generally at 100 has a top face 116, a bottom face 118, and six sides: hot side 120, second clockwise side 122, third clockwise side 124, cool side 126, fifth clockwise side 128 and sixth clockwise side 130. For the purposes of the description, hot side 120 is assumed to be along the hotter region of the environmental column, and since the coolest region will be opposite in most cases, cool side 126 is assumed to be along the cooler region of the column.

The preferred embodiment would have the same number of coolant passageways as the adjacent fuel elements and column portions. The locations of three such exchange passageways are indicated in FIG. 4. A cool-shift passageway 140 is shown extending from its entrance 142 adjacent edge 131 on the top face, parallel to the hot side 120, to an upper vertex 144 one-third down the vertical extent of the exchange element and located 60° clockwise of the entrance position. From the upper vertex the cool-shift passageway extends parallel second clockwise side 122 to a lower vertex 146 two-thirds down the vertical extent of the exchange element and located on a vertical 120° clockwise of the entrance position. From the lower vertex the cool-shift passageway extends parallel third clockwise side 124 to an exit 148 position located 180° clockwise of the entrance position.

Hot-shift passageway 150 extends from an entrance position 152 near the center of the cool side 126 along the same side to an upper vertex 154 adjacent an edge 127 less than one-third down the vertical extent of the exchange element. From the upper vertex 154 the hot-shift passageway extends along the fifth clockwise side 128 to a central vertex 155 adjacent an edge 129 between one-third and two-thirds down the vertical extent of the exchange element. From the central vertex the passageway extends to a lower vertex 156 adjacent an edge 131 more than two thirds down the vertical extent of the exchange element. From the lower position, the hot-shift passageway extends to an exit 158 position on the bottom face 118 midway along the hot side 120 which is 180° from the entrance position of the hot-shift passageway 150.

A no-shift passageway 160 extends vertically through the exchange element 100. Since the temperature gradients are less between the more central coolant passageways, there is less to gain from exchanges among them. Practically, only the one, two or three most peripheral hexagonal rows of coolant passageways need be exchanged. In the preferred embodiment three rows 109, 110 and 111, shown in FIG. 2, are exchanged. The center passageway 106 and the passageways of the two centermost hexagonal rows 107 and 108 are vertical.

Generally, for a hexagonal exchange element with concentric hexagonal rows of passageways, the passageways of any given hexagonal row are either all shift passageways or all no-shift passageways. No-shift passageways extend axially through the exchange element. Each shift passageway extends parallel to the perimeter of the exchange element with a downward slope equal to the height of the flow exchange element divided by the perimeter of the hexagonal row containing the entrance to the shift passageway. Each exchange passageway has three or four straight segments 162, and two or three vertices therebetween where the passageway makes its closest approach to an edge. The exit position of the passageway on the bottom face 118 will be rotated one-half circle from the entrance position on the top face 116. In other words, each end face position is the reflection of the other through the center point of the exchange element.

Figure 5:
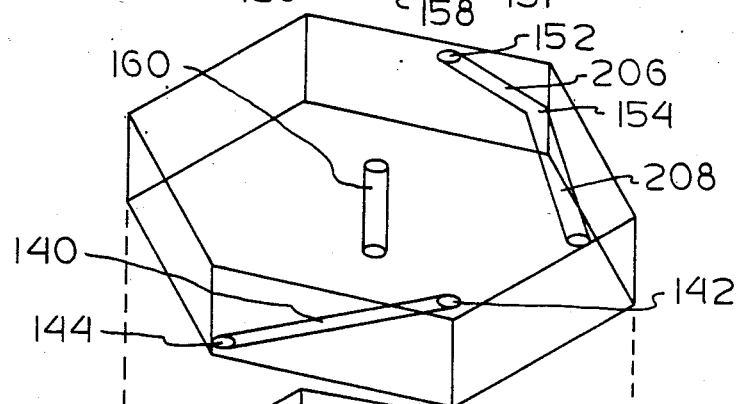
FIG. 5 is an exploded view of the flow exchange element of FIG. 4.
Figure 5:
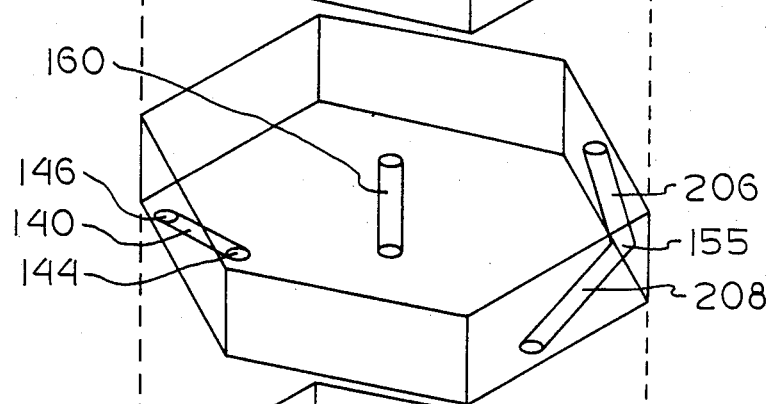
Figure 5:
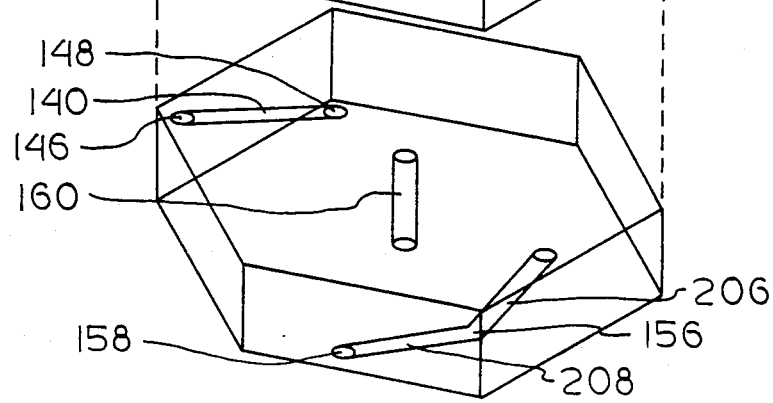

The above structure poses a problem in manufacture with regard to the segments 162 of the passageways between the internal angles of the exchange element 100. One novel solution is to manufacture the exchange element in three hexagonal slices 200, 202, and 204 as shown in FIG. 5. Preferably, each slice has the same cross section as the exchange element 100, and has one-third the height of the exchange element. If the exchange element has the preferred 120° rotational symmetry, the slices can be identical. As shown in FIG. 5 each passageway has at most one vertex 144, 146, 154, 155, or 156 per slice. Passageways originating adjacent an edge of the exchange element, such as cool-shift passageway 140, may be drilled straight; other shift passageways, such as hot-shift passageway 150, may be formed by drilling an upper leg 206 through the top of each slice and a lower leg 208 through the bottom of each slice, the legs to be joined within each slice at the vertices. Of course, vertical passageways require only a single straight drilling. The slices may then be joined by suitable means to form the novel flow exchange element. The slice manufacturing approach can be extrapolated to other forms of exchange elements: for instance, an exchange element with a square cross section could be manufactured in two slices.

In operation, the preferred embodiment functions as follows. The flow exchange element 100 is inserted into a column (not shown) at or near the half power point. This means that the power generated above the exchange element equals the power generated below the exchange element. Coolant flows downwardly from the upper portion of the column into the passageways of the flow exchange element. For the sake of description, we are assuming that the cool-shift passageway entrance 142 is within a hotter vertical region of the column, that the hot-shift passageway entrance 152 is within a cooler vertical region of the column, and that no-shift passageway 160 is within an intermediate vertical region of the column.

Coolant flowing down a passageway axially adjacent hot-shift passageway entrance 152 and within the cooler upper region of the column enters the hot-shift passageway 150 through the top face 116 of the exchange element 100. The coolant flows down and around the segments of the hot-shift passageway 150, exiting through a hot-shift exit 158. The coolant then flows down a passageway in a hotter region of the lower portion of the column. In this way the relatively effective coolant is diverted to the region most needing cooling.

Coolant flowing down the hotter region of the upper portion of the column flows into the cool-shift passageway 140 at its entrance 142. From there, coolant flows down and around the segments of the cool-shift passageway, exiting at its exit 148. The coolant then flows down a passageway through the cooler region of the lower portion of the column. Since the hotter coolant of the upper portion of the column is subjected to less heat in the lower portion of the column the gradient between the hotter and cooler passageways is reduced as coolant progresses downwardly through the lower portion of the column. In this way hot spots within the core can be alleviated and hot streams can be virtually eliminated.

Coolant flowing down the intermediate region of the upper portion of the column flows into a no-shift passageway 160 and then into the intermediate region of the lower portion of the column. Gradients within the intermediate region are considered too small to justify the expense of exchanging flow among passageways therein.

Analyses performed utilizing such an element resulted in the following data. Without the flow exchange element the column resulted in maximum temperature differentials of about 200° C. at the exit plenums at the bottom of the column. With the flow exchange element at the half power point in the column the maximum temperature differential was about 80° C.; the location of the maximum was at the half power point. The temperature differential at the column exit was negligible; in other words, hot streams were practically eliminated.

It is apparent that the flow exchange element presented is a flexible nuclear reactor design tool. If placed at the one-third power point, the flow exchange element can further reduce maximum temperature gradients within the column. Adding a second fuel exchange element at the two-thirds power point would enable retaining the negligible gradient at the column exit. Different internal structures are possible in connection with a hexagonal column and the invention is adaptable to other column types.

In accordance with the above description, a flow exchange element is presented which is adapted to use in nuclear reactors comprising columns, particularly hexagonal columns, of stackable fuel elements. As described, the flow exchange element may be manufactured in slices which may be easily drilled and then joined by suitable means. The flow exchange element serves as a means for reducing or eliminating hot spots and hot streams within a reactor column. As a result of more even temperatures, and concomitantly, lower local temperature maximums, nuclear reactor cores and the surrounding materials are subject to less radiation and stress. Thus, repairs or replacements are more infrequent and the inherent safety of the reactor is enhanced.

Many possible modifications in the structure, mode of use, and method of manufacture have been suggested above, and others are possible without going beyond the spirit and scope of the present invention.

We claim:

1. In a gas-cooled nuclear reactor having a pressure vessel, a core disposed within said pressure vessel, said core having a plurality of fuel elements arranged in an array wherein hotter and cooler regions exist at different radial locations at any vertical level within said core, the combination comprising
   a plurality of prism-shaped nuclear fuel elements, each having an upper face, a lower face, vertical sidewalls and a plurality of vertical coolant passageways extending between its upper and lower faces and interior of its sidewalls through which coolant gas flows, said array including a plurality of stacks of said fuel elements with said vertical passageways in upper elements of each stack being aligned and vertical passageways in lower elements of each stack being aligned, and in at least some of said stacks flow-exchange means disposed between said upper stacked fuel elements and said lower stacked fuel elements, said flow exchange means each having a top face, a bottom face, vertical sidewalls and a plurality of non-intersecting passageways extending between its top face and its bottom face and within its sidewalls, each of said plurality of non-intersecting passageways connecting a coolant passageway in the next upper fuel element to a coolant passageway in the next lower fuel element, at least some of said connecting passageways in said flow-exchange means being disposed at an angle to the vertical for shifting the coolant flow between a vertical passageway at one side of the next upper fuel element and a vertical passageway at another side of the next lower fuel element.

2. A combination in accordance with claim 1 in which some of said passageways in said flow-exchange block are inclined to shift the coolant flow from one side of the stack to another, and others of said passageways in said flow-exchange means are axially aligned for straight-through flow of coolant between said upper and lower stacked fuel elements.

3. A combination in accordance with claim 1 in which some of said passageways in said flow-exchange means are inclined to shift the coolant flow through approximately 180 degrees, and others of said passageways are axially aligned for straight-through flow of coolant between said upper and lower stacked fuel elements.

4. A combination according to claim 1 wherein each of said flow exchange means comprises a prism-shaped block having coolant flow passageways extending therethrough from a top face of said block to a bottom face of said block, each block passageway having an entrance at the top face and an entrance at the bottom face, a plurality of said block passageways being inclined to the vertical to divert coolant flowing between a passageway at one side of one vertically adjacent fuel element and a passageway at another side of the other vertically adjacent fuel element.

5. A combination in accordance with claim 1 wherein said upper and lower fuel elements are in the shape of hexagonal prisms and wherein said each of said flow-exchange means comprises a block in the shape of a regular hexagonal prism having passageways that each extend therethrough between an entrance at the top face of said block and an entrance at the bottom face of said block, said entrances being arranged in concentric hexagonal rows on the top face and on the bottom face, a plurality of said passageways being non-shift passageways extending vertically through said block with top and bottom entrances vertically aligned, and a plurality of passageways being shift passageways extending at an angle through the block to convey coolant from one side of said block to another side of said block.

6. The combination in accordance with claim 5 further characterized in that each of said passageways having entrances on the outermost of the hexagonal rows of entrances is a shift passageway.

7. The combination in accordance with claim 5 further characterized in that each passageway having entrances on the outermost row is a shift passageway and each passageway having entrances on the innermost row is a non-shift passageway.

8. The combination in accordance with claim 5 further characterized in that each shift passageway extends parallel to the perimeter of said block along a constant slope.

9. In a gas-cooled nuclear reactor having a pressure vessel, a core disposed with said pressure vessel and a means for flowing cooling gas vertically through said core, said core comprising
   a plurality of prime-shaped fuel elements each having an upper face, a lower face, vertical sidewalls and a plurality of passageways extending vertically between said upper face and said lower face and within said sidewalls,
   a plurality of prism-shaped heat exchange blocks each having an top face, a bottom face, vertical sidewalls and a plurality of non-intersecting passageways extending between its top face and its bottom face and within its sidewalls, at least a portion of said block passageways being flow-exchange passageways opening to said top and bottom faces on different sides,
   said fuel elements being arranged in said core in a plurality of stacks of prism-shaped fuel elements with the vertical passageways of vertically stacked elements aligned and with the array of stacks providing hotter and cooler radial locations at any vertical level with said core,
   at least some of said stacks containing at least one flow-exchange block disposed between upper and lower stacked fuel elements, each passageway through said block communicating a passageway of the fuel element stacked thereabove with a passageway of the fuel element stacked therebelow, each of said flow-exchange passageways shifting coolant gas flow between aligned vertical passageways at one side of stacked upper fuel elements and aligned vertical passageways at another side of stacked lower fuel elements.

10. In a nuclear reactor having a pressure vessel, a core disposed within said pressure vessel and a means for flowing coolant gas vertically to said core, said core comprising a plurality of hexagonal prism-shaped fuel elements each having an upper face, a lower face, vertical sidewalls and a plurality of vertical passageways extending between said upper face and said lower face and within said sidewalls, said passageways being arranged in concentric hexagonal rows, a plurality of flow-exchange blocks each in the shape of a hexagonal prism having a top face, a bottom face, vertical sidewalls and a plurality of non-intersecting passageways extending from its top face to its bottom face within its sidewalls, said block passageways being arranged in concentric hexagonal rows, the passageways in inner rows extending vertically between said top face and said bottom face, the passageways in at least the outermost row extending at an angle through the block to open on said bottom face along one side of said block and to open at said top face along another side of said block, said fuel elements being arranged in said core in a plurality of stacks of fuel elements, the vertical passageways of stacked fuel elements being aligned, the array of stacks providing hotter and cooler radial locations within said core, and at least some of said stacks of fuel elements containing at least one of said flow-exchange blocks disposed between upper and lower stacked fuel elements, each passageway of said flow-exchange block communicating a passage of the fuel element stacked thereabove with a passageway of the fuel element stacked therebelow, each of said angled passageway shifting coolant gas flow between aligned vertical passageways at one side of stacked upper fuel elements and aligned vertical passageways at another side of stacked lower fuel elements.

* * * * *

UNITED STATES PATENT AND TRADEMARK OFFICE
CERTIFICATE OF CORRECTION

PATENT NO. : 4,547,334
DATED : October 15, 1985
INVENTOR(S) : Brogli et al.

It is certified that error appears in the above-identified patent and that said Letters Patent is hereby corrected as shown below:

In the Title:       "LOW" should read --FLOW--.

Abstract, Line 3:   "temperature" should read --temperatures-- (first occurrence).

Col. 1, Line 3:     "LOW" should read --FLOW--.

Col. 2, Line 46:    "rotated" should read --rotates--.

Col. 4, Line 31:    "shownn" should read --shown--.

Col. 8, Line 47:    "prime-shaped" should read --prism-shaped--.

Col. 8, Line 65:    "with" should read --within--.

Signed and Sealed this

Fourteenth Day of January 1986

[SEAL]

Attest:

Attesting Officer

DONALD J. QUIGG

Commissioner of Patents and Trademarks